United States Patent [19]

Butterfield et al.

[11] 4,216,678

[45] Aug. 12, 1980

[54] DRIVE SYSTEM

[75] Inventors: Roger P. Butterfield, Candor; David C. Wade; Gary A. Woollard, both of Ithaca, all of N.Y.

[73] Assignee: Borg-Warner Corporation, Chicago, Ill.

[21] Appl. No.: 896,653

[22] Filed: Apr. 17, 1978

[51] Int. Cl.[2] ..... F16H 55/52

[52] U.S. Cl. ..... 474/12; 474/13; 474/46

[58] Field of Search ..... 74/230.17 E, 230.17 A, 74/230.17 R, 230.17 M, 230.17 C

[56] References Cited

U.S. PATENT DOCUMENTS

| | | | |
|---|---|---|---|
| 2,556,512 | 6/1951 | Ammon | 74/230.17 M |
| 2,694,316 | 11/1954 | Hultin | 74/230.17 M |
| 2,900,834 | 8/1959 | Bessette | 74/230.17 M |
| 3,605,511 | 9/1971 | Deschene | 74/230.17 E |
| 3,727,476 | 4/1973 | Heidorn | 74/230.17 M X |
| 3,757,593 | 9/1973 | Svenson | 74/230.17 E |
| 3,850,050 | 11/1974 | Lemmens | 74/230.17 M |
| 3,884,316 | 5/1975 | Bowers | 74/230.17 M |
| 3,996,811 | 12/1976 | Reese | 74/230.17 M |
| 4,020,711 | 5/1977 | Wollard | 74/230.17 E |
| 4,100,818 | 7/1978 | Wollard | 74/230.17 E |

FOREIGN PATENT DOCUMENTS

| | | | |
|---|---|---|---|
| 981059 | 1/1976 | Canada | 74/230.17 R |
| 1 43453 | 9/1956 | Fed. Rep. of Germany | 74/230.17 E |
| 2715758 | 10/1977 | Fed. Rep. of Germany | 74/230.17 E |
| 1456796 | 11/1976 | United Kingdom | 74/230.17 E |

*Primary Examiner*—Leslie Braun
*Attorney, Agent, or Firm*—Aubrey L. Burgess

[57] ABSTRACT

A drive system especially adapted for driving accessories associated with the engine of a vehicle and controlled essentially by the speed of the engine crankshaft. The drive system comprises a pair of variable pulleys interconnected by a flexible belt, one pulley being driven from the engine crankshaft and the other pulley being associated with one or more accessories.

4 Claims, 5 Drawing Figures

98
113
76
12
74
82
112
110
96
114
88
93
80
78
92
90
106
108
100
104
84
102
116
16
18
34
42
38
25
44
27
26
29
24
65
32
30
28
68
60
40
58
64
36
62
52
70
14
66
10
20
22
46
56
48
54
50

76
12
74
112
98
110
113
114
82
96
97
88
93
80
78
108
106
100
92
90
84
102
104
116
16
18
34
42
44
25
24
38
10
27
29
26
62
30
65
28
68
64
32
60
58
40
36
14
52
66
70
20
22
46
56
54
48
50

42
38
40
44
38
42
42
38
44
44
36

DRIVE SYSTEM

BACKGROUND OF THE INVENTION

Modern vehicle engines have been called upon to drive an increasing number of accessories as the sophistication of modern vehicles increases, which accessories include many convenience items demanded by the customer.

Generally, the accessory drive provides at least a linear ratio between the speed (rpm) of the engine and the speed (rpm) of the accessory driven shaft. At low engine speeds, no serious problems exist; but at high engine speeds serious problems exist. Because of this relationship, it is imperative to construct the accessory with proper bearings, so that it can operate at elevated speeds without an undue limitation on its life. The strength and size of rotating parts must be such that extremely high speeds do not rupture them. In addition, the wide variation in operating speed of an accessory at times creates a demand for sophisticated control systems. Such construction makes the accessory more expensive than necessary or desirable both as original equipment (OEM) parts and as replacement parts. Driving the accessories at very high speeds results in a substantial decrease in the efficiency of the vehicle because a substantial percentage of the output is required for the accessory drive. This is extremely wasteful because the present fixed ratio drives result in accessory speeds which are not required for proper operation of the accessories.

This problem becomes even more severe in some modern engines which are of relatively low horsepower and which operate at relatively high speeds. Further, the lack of efficiency of the system requires the use of more gasoline—a needless and serious waste of energy. In addition, each accessory normally has a most efficient or optimum RPM range and with normal systems the accessory is not within this range due to wide variation in the input speed.

Various energy saving types of accessory drives have been proposed. For example, the drive between the engine and the fan for cooling the radiator has been thermostatically controlled. This type of drive is temperature dependent and has no relation to engine shaft speed. Such a drive is not suitable for alternator or generator drive because these accessories must be driven continuously when the engine is operating. Other types of drives employ slipping friction clutches; while they may be successful, they have not found acceptance because of the cost of the drive and energy losses during operation.

For an accessory drive system to meet requirements for use in modern vehicles, it should be small enough to fit in present-day engine compartments without any substantial modifications, it should be relatively inexpensive, it should be susceptible of mass production and adjustable to modern assembly techniques, it should have long life, and it should produce a drive from the engine to the accessories which increases their speeds in approximately a linear relation with increasing engine speed at low RPM but which produces relatively constant accessory speeds as the engine speed increases about a predetermined point throughout the normal vehicle driving range. The present invention meets all these criteria.

The drive of this invention is to be distinguished from the conventional variable pulley transmission as is presently used in, for example, off-the-road vehicles or has been proposed for the transmission for transmitting power from an engine to the driving mechanism of a vehicle, whether they are wheels, lugs or other devices. In such prior transmissions, the engine rpm is increased and, at the same time, the rpm of the driven mechanism is increased at an even faster rate.

THE INVENTION

This invention relates to a drive system especially constructed for transmitting rotary motion to accessories associated with a prime mover. The drive system is also adaptable for transmitting rotary motion between a driven and a driving means where similar drive characteristics are required or desired.

The drive comprises a relatively inexpensive assembly of variable diameter pulleys which can be constructed largely of stamped metal parts and which are connected by a belt. The belt is generally the only part which will require replacement even after a considerable length of operating time.

More specifically, the drive system of this invention comprises a pair of variable pitch diameter pulleys, one a driveR associated with the drive or crankshaft of an engine, and the other, a driveN associated with a driven shaft and pulleys for driving the accessories, either individually or as a package. Each of the variable pulleys has an axially fixed flange and an axially movable flange, the change in pitch diameters of the pulleys being responsive to the speed of the crankshaft.

The driveR assembly includes a torque cam-follower means to transmit torque between the crankshaft and the axially movable pulley flange and a spring with centrifugally actuated weights is associated with the driveR axially movable pulley flange. The spring and weights thereon operate on the sliding flange of the driveR pulley and determine shift points. The spring and therefore the sliding flange are deflected as a function of input speed only, making the drive speed and not torque responsive; the cam-follower means prevents shifting of speed ratios due to torque variations.

The driveN assembly also comprises a torque cam-follower connecting the pulley flanges and a torsion spring so arranged to maintain the follower in engagement with the cam. The spring also functions to initially load the axially movable pulley flange so as to maintain the belt contact with the flanges.

In the specific embodiment described herein, the driveR and driveN pulleys rotate at a fixed ratio at low engine or crankshaft speeds, as for example, a ratio of 1 to 1.41, when the accessory drive pulley is rotating at approximately 1700 rpm and the engine crankshaft is rotating at approximately 1200 rpm, centrifugal force acting on the weights connected to the driveR spring causes movement of the weights resulting in the driveN pulley being substantially locked at the same rpm while the crankshaft speed can attain much higher speeds. When the weights can no longer move, the drive again becomes fixed in a drive ratio of 1.41 to 1. The much higher crankshaft speed is generally one which corresponds to a vehicle speed above the national limits. Thus in the driving range of, for example, an engine speed of 1200 to about 2400, which for domestic automobiles in the range of 30 mph to about 55 mph, the driveN shaft from which the majority of accessories are driven is rotating in the embodiment being described at approximately 1700 rpm.

Each of the accessories can be driven at substantially its optimum speed from the driven shaft at least over the major driving speed of the vehicle, it being recognized that the optimum speed of each accessory may be different and can be achieved by providing various drive ratios between the driven shaft and the particular accessory.

THE DRAWINGS

DETAILED DESCRIPTION

Figure 1:
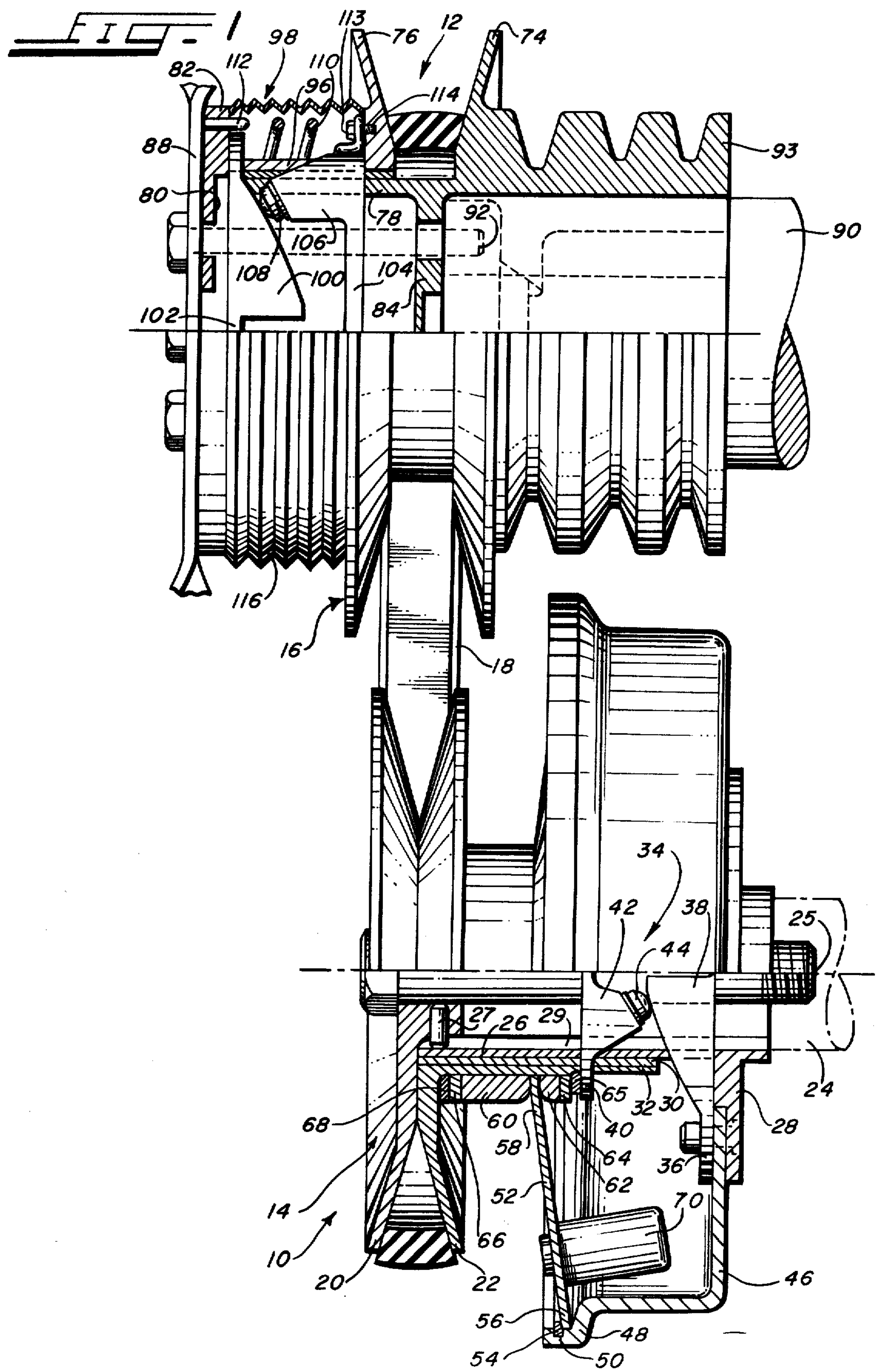
FIG. 1 is a partial sectional view through a drive system according to this invention in idle condition.
Figure 2:
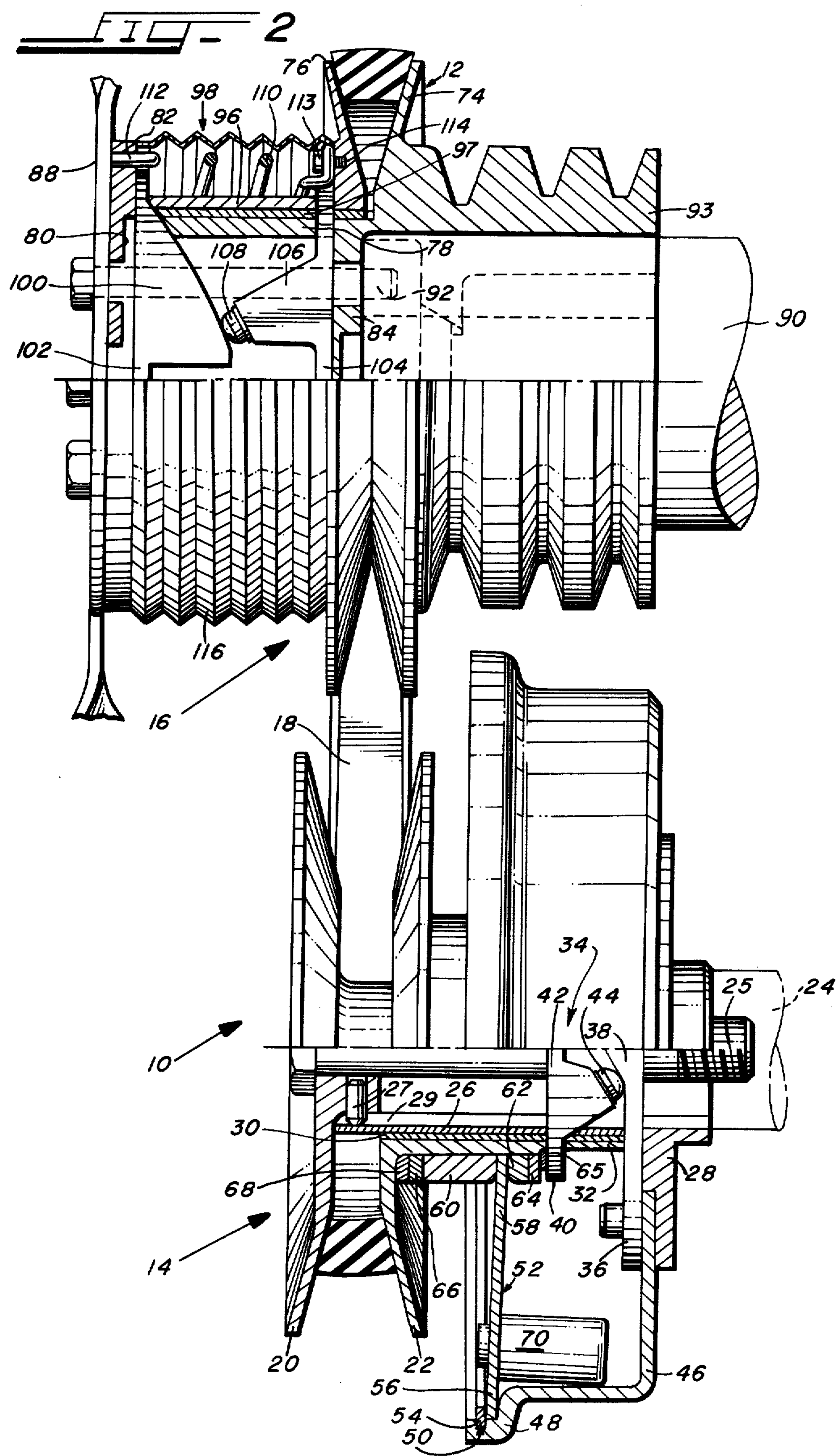
FIG. 2 is a partial sectional view through a drive system according to this invention in one of its operating conditions.

Looking now at FIGS. 1 and 2 which show the drive in different operating conditions, there is a driveR assembly 10 and a driveN assembly 12, each having a variable pulley 14 and 16, respectively, drivingly connected by a belt 18.

The driveR assembly 10 includes the variable pulley 14 which comprises a fixed flange 20 and a movable flange 22. The fixed flange is bolted to the crankshaft 24 of a prime mover by means of a bolt 25. A sleeve member 26 with an axially extending flange 28 surrounds the bolt 25. A pin 27 is received in a slot 29 in the sleeve 26 and prevents relative rotation of the flange 20 and the shaft 24. Surrounding the sleeve member 26 is a sleeve bearing 30 and surrounding the sleeve bearing 30 is an axially extending sleeve 32 integral with the movable flange 22. This construction permits relative rotation, as necessary, between the fixed and movable flanges 20 and 22, respectively.

Figure 5:
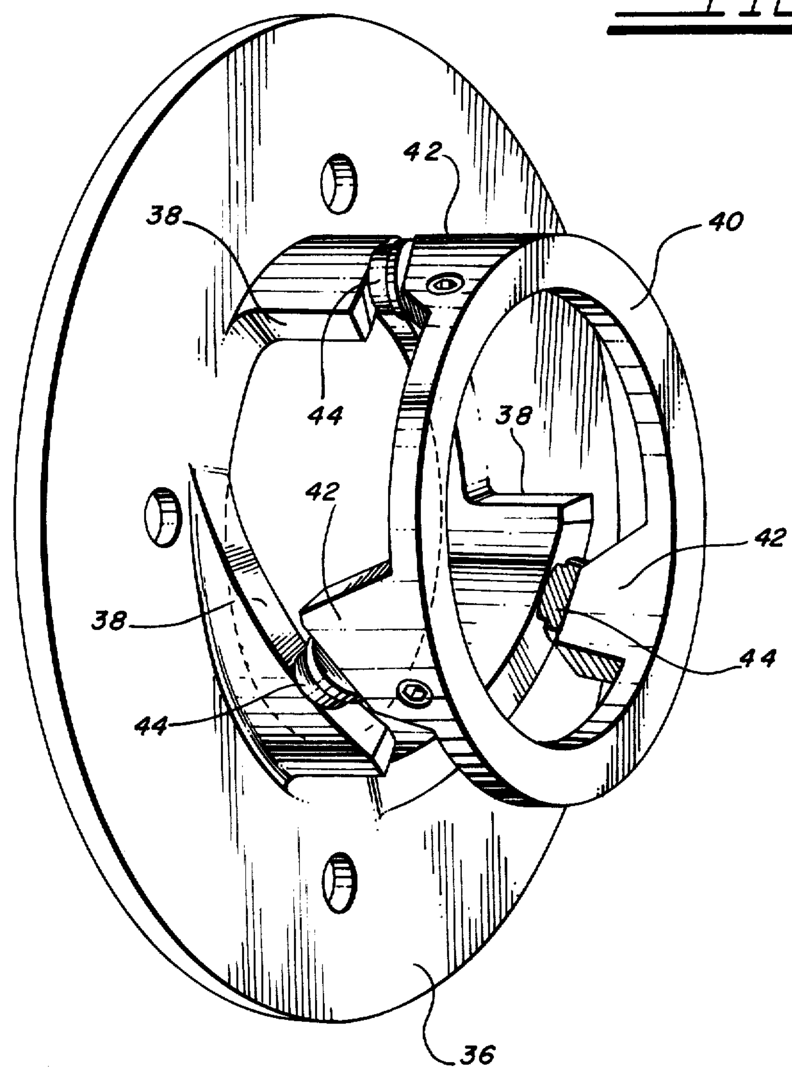
FIG. 5 is an illustration of a typical torque cam-follower means usable in the drive system of this invention.

The assembly 10 also comprises a torque cam-follower means 34 comprising a torque cam member 36 having a plurality of cams 38, which member is connected to the flange 28 of the sleeve member 26. The cam member 36 is axially and rotationally fixed with respect to the sleeve member 26. The means 34 also comprises a torque follower member 40 having a plurality of followers 42, which member is connected to the sleeve 32 of the movable flange 22. A pad 44 of low friction material such as a plastic, is attached to each follower 42 to contact the respective cam 38. The member 36 is essentially a disc with extending cams 38 and the follower member 40 is also essentially a disc with extending followers 42. A typical torque cam-follower means is illustrated in FIG. 5. In the embodiment being described, there are three cams 38 and three followers 42 in the torque cam-follower means 34. The main consideration is to provide a cam for each follower.

Figure 3:
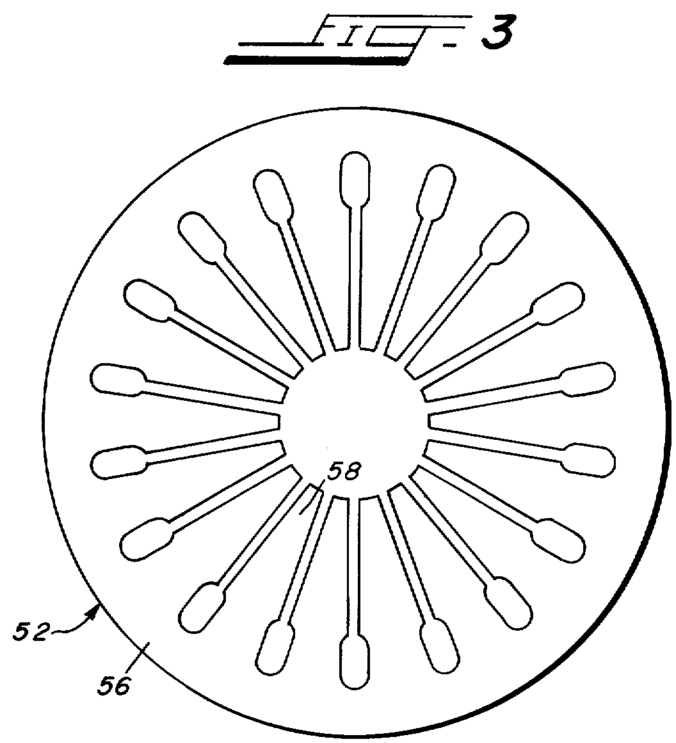
FIG. 3 is a plan view of a disc spring with radially inwardly directed fingers usable in the driveR assembly.

Also connected to the flange 28 of the sleeve member 26 is a cup-shaped spring retainer 46 having a rim 48 with a groove 50 therein. A spring 52 is received in the rim 48 and is retained therein by means of a snap ring 54 received in the groove 50. The spring 52 is illustrated in FIG. 3 and comprises a disc portion 56 with radially inwardly extending fingers 58. The spring 52 is preloaded to a first deflection position (FIG. 1) such that at idle and low shaft speeds it urges the movable flange 22 toward the fixed flange 20.

The terminal ends of the fingers 58 are received between fulcrum members 60 and 62, the noses of each being rounded as illustrated. The members 60 and 62 are ring-like, surrounding the sleeve 32 of the movable flange. A ring-like thrust bearing 64 is located between the fulcrum 62 and the follower member 40 being axially positioned by a snap ring 65, and a ring-like thrust bearing 66 is positioned between the fulcrum 60 and a ring-spacer 68 which surrounds the sleeve 32. One end of the spacer 68 abuts the movable flange 22. The thrust bearings 64 and 66 permit relative rotation between adjacent parts.

A plurality of weights 70 are attached to the spring 52 and move generally outwardly under the influence of centrifugal force. These weights are responsive to the speed of the crankshaft 24 and as they move outwardly, cause the spring to move toward the position illustrated in FIG. 2. The terminal ends of the spring fingers 58 roll or rock on the rounded noses of the fulcrums 60,62. Movement of the spring causes axial movement of the sleeve 30 and thus of the flange 22. When the weights "bottom" on the retainer 46, no further axial movement of the flange 22 can occur. The drive ratio between the pulleys 14 and 16 is then fixed.

For accessories whose speed must be fixed with the crank-shaft speed, a pulley may be provided on the outside of the retainer 46. Such a pulley is not illustrated herein.

The driveN assembly 12 comprises the pulley 16 having an axially fixed flange 74 and an axially movable flange 76. The flange 74 is provided with an axially extending sleeve portion 78, the terminal end of which abuts the defining walls of a recess 80 in a plate 82. The flange 74 also has a web portion 84. The engine fan 88 and the assembly 12 have fasteners 92 passing through suitable openings in the web portion 84 and the plate 82. The flange 74 also has a rearwardly extending grooved member 93 which is adapted to receive belts driving various accessories for the vehicle.

The axially movable flange 76 has a forwardly extending sleeve portion 96 surrounding but spaced from the sleeve 78 of the fixed flange 74 by a sleeve bearing 97. A cam-follower means 98 is positioned between the plate 82 and the flange 76 and comprises a plurality of cams 100 on a cam ring 102 and a follower ring 104 having a plurality of followers 106. The follower ring 104 is connected to the flange 76. Pads 108 of plastic or other low friction material are carried by each follower 106 to ride on the respective cams 100. In the embodiment illustrated, there are three cam lobes and followers. The torque cam-follower is similar to that illustrated in FIG. 5. A torsion, coil spring 110 surrounds the sleeve portion 96. One end of the spring has a tang 112 received in an opening in the plate 82 and the other end is connected to the follower means 102 by a bolt 113 received in an opening 114. A flexible dust cover 116 is positioned around the torque cam-follower means, as illustrated to prevent entry therein of dust and dirt.

In operation, the driveR and driveN pulleys will be in the drive condition as illustrated in FIG. 1 up to the shifting speed, i.e., in the embodiment being described, a crankshaft speed of approximately 1200 rpm. As the crank-shaft speed increases, the weights begin to move outwardly by centrifugal force toward the spring retainer 46 which acts as a stop means. The position of the driveR spring means toward that shown in FIG. 2 and the movable flange 22 (because of the construction of the assembly) moves axially away from the fixed flange 20 permitting the belt 18 to ride lower in the pulley 14. The followers 42 ride downwardly on the cams 38.

With the belt tension reduced, the flange 76 of the driveN pulley moves axially toward the flange 74, the spring 110 assisting the movement. The followers 106 ride higher on the cams 100.

The changing ratio of the drive allows the driveN shaft 90 (and the fan 88) to rotate at an essentially constant speed. In this embodiment, about 1700 rpm, the same speed as when the weights 70 started moving.

When the weights 70 bottom on the spring retainer 46, the drive again becomes locked in a certain drive ration.

Figure 4:
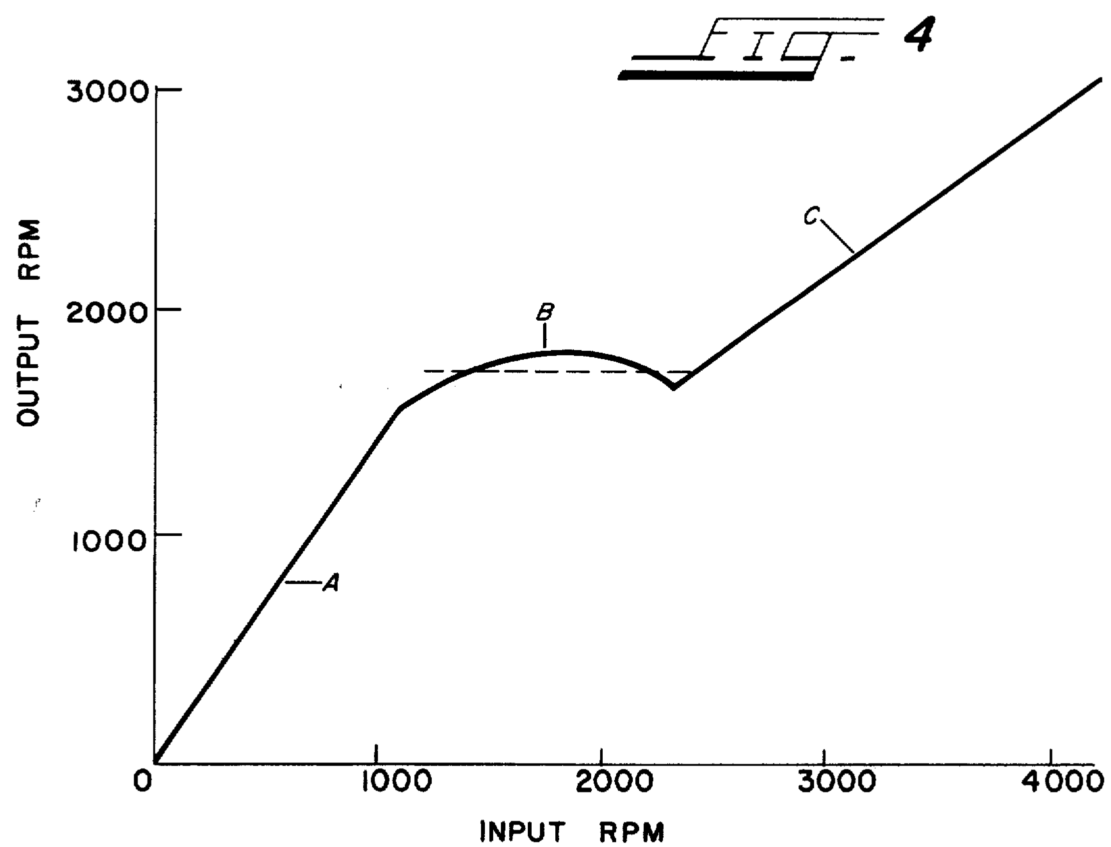
FIG. 4 is a curve in which fan or output rpm is plotted against crankshaft or input rpm and which relationship can be achieved using the drive system of this invention.

A typical shift curve is shown in FIG. 4 in which output (driveN) rpm is plotted against input (driveR) rpm. As can be seen, the speed relationship between the driveR and driveN pulleys is a fixed ratio A to a certain value, at which time the weights 70 move outwardly resulting in the axial movement of the driveR pulley flanges away from each other. At this time the driveN pulley flanges axially move toward each other. The drive ratio during this time is shown on the curve as B. The continued movement of the weights 70 eventually brings about the pulley relationship of FIG. 2 where the weights 70 have bottomed on the retainer 46 and the drive is then again in a fixed drive ratio C. Because the drive mechanism of this invention is speed responsive, the curbe B has no sharp dips when an accessory, such as air conditioning, is activated.

What is claimed is:

1. Apparatus for transmitting drive between a drive shaft adapted to be connected to an engine and a driven shaft and especially for driving accessories driven by one of the shafts, the combination comprising:

a first variable pulley rotationally associated with the drive shaft and having an axially fixed flange connected to the drive shaft and a movable flange movable axially relative to the fixed flange and the drive shaft;

a torque cam and a cam follower connected respectively to the drive shaft and the movable flange for transmitting torque between the drive shaft and the movable flange;

speed responsive means for moving the movable flange axially away from the fixed flange above a first predetermined speed above zero speed of the drive shaft;

said speed responsive means comprising a disc spring biasing the movable flange and also centrifugally responsive means associated with the disc spring which is actuated by centrifugal force above said first predetermined speed of the drive shaft to change the bias of the spring and thus effect axial movement of the movable flange;

a second variable pulley rotationally associated with the driven shaft and having an axially fixed flange connected to the driven shaft and a movable flange movable axially relative to the second named fixed flange and the driven shaft;

a second torque cam and a second cam follower connected respectively to the driven shaft and to the second named pulley movable flange for controlling the axial movement of the second named pulley movable flange with respect to its fixed flange;

a spring between the second torque cam and its follower to provide an axially directed force urging the second pulley flanges toward one another;

drive means between the variable pulleys to provide a drive therebetween, the drive ratio between the pulleys being determined by the position of the pulleys movable flanges with respect to their respective fixed flanges; and said apparatus being so constructed and arranged to provide substantially a fixed ratio drive between the drive and driven shafts at relatively low drive shaft speeds up to the first predetermined speed of the drive shaft and also to provide a substantially constant driven shaft speed for speeds of the drive shaft above the first predetermined speed to a second and higher predetermined speed of the drive shaft.

2. Apparatus as recited in claim 1 wherein said speed responsive means further comprises weights connected to the first named movable flange and adapted to move outwardly by centrifugal force effective above the first predetermined speed of the drive shaft and wherein the disc spring is initially pre-loaded so as to be deflected to a first position, the deflection of the spring increasing as the weights move outwardly by centrifugal force.

3. Apparatus as recited in claim 2 further comprising stop means limiting the outward movement of the weights at the second predetermined speed of the drive shaft at which time the drive and driven shafts rotate at a second fixed ratio.

4. Apparatus as recited in claim 1 wherein the spring between the second torque cam and its follower is a torsion spring urging the second follower to ride on the second torque cam.

* * * * *